(12) United States Patent
Diener et al.

(10) Patent No.: US 7,794,682 B1
(45) Date of Patent: Sep. 14, 2010

(54) METHODS FOR FULLERENE RECOVERY

(75) Inventors: Michael D. Diener, Boulder, CO (US);
James W. Raebiger, Golden, CO (US);
Robert D. Bolskar, Arvada, CO (US);
John M. Alford, Lakewood, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 1060 days.

(21) Appl. No.: 11/364,808

(22) Filed: Feb. 28, 2006

Related U.S. Application Data

(60) Provisional application No. 60/656,956, filed on Feb. 28, 2005.

(51) Int. Cl.
*C01B 31/02* (2006.01)
*C01B 31/00* (2006.01)

(52) U.S. Cl. ............. 423/445 B; 423/461; 423/447.1; 423/447.5; 977/845

(58) Field of Classification Search ............ 423/447.1, 423/461, 447.5, 445 B; 977/845; *C01B 31/00, C01B 31/02*
See application file for complete search history.

(56) References Cited

U.S. PATENT DOCUMENTS

| | | | |
|---|---|---|---|
| 5,475,172 A | 12/1995 | Cahill et al. | |
| 5,587,476 A | 12/1996 | Kampe et al. | |
| 5,648,523 A | 7/1997 | Chiang | |
| 5,717,076 A | 2/1998 | Yamamoto et al. | |
| 5,869,626 A | 2/1999 | Yamamoto et al. | |
| 6,020,523 A | 2/2000 | Chiang | |
| 6,046,361 A | 4/2000 | Chiang | |
| 6,162,926 A | 12/2000 | Murphy et al. | |
| 6,303,016 B1 | 10/2001 | Diener et al. | |
| 6,355,225 B1 | 3/2002 | Alford et al. | |
| 6,399,785 B1 | 6/2002 | Murphy et al. | |
| 6,517,799 B2 | 2/2003 | Diener et al. | |
| 6,613,771 B2 | 9/2003 | Friedman et al. | |
| 7,208,132 B2 * | 4/2007 | Bolskar et al. | ............. 423/461 |
| 2003/0065206 A1 | 4/2003 | Bolskar et al. | |
| 2003/0157016 A1 | 8/2003 | Bolskar et al. | |
| 2003/0220518 A1 | 11/2003 | Bolskar et al. | |

FOREIGN PATENT DOCUMENTS

EP 1 071 149 1/2001

(Continued)

OTHER PUBLICATIONS

Starks, (Journal of the American chemical society, 1971, 93:195-199).*

(Continued)

*Primary Examiner*—Melvin C Mayes
*Assistant Examiner*—Jun Li
(74) *Attorney, Agent, or Firm*—Greenlee Sullivan P.C.

(57) ABSTRACT

A method of extracting fullerenes from a carbon matrix in which they are produced. The method is applicable to both fullerenes that exhibit greater than 0.1 mg/ml solubility in toluene and to fullerenes that are essentially insoluble in toluene, i.e., those exhibiting less than or equal to 0.1 mg/ml solubility. The method disclosed herein extracts more of the soluble fullerenes from the carbon matrix than extraction conducted by solely contacting with solvent. A method is also provided for creating salts of the extracted fullerenes.

8 Claims, 6 Drawing Sheets

FOREIGN PATENT DOCUMENTS

| WO | WO 94/05671 | 3/1994 |
|----|-------------|--------|
| WO | WO 96/26186 | 8/1996 |
| WO | WO 96/36631 | 11/1996 |
| WO | WO 03/029136 | 4/2003 |

OTHER PUBLICATIONS

Barton, 1991 CRC handbook of solubility parameters and other cohesion parameters, second edition, p. 291-294 Table 16).*

Fagan et al (Journal of American chemical society 1992, 114,9697-9699).*

Reed et al (Chem Rev 100: 1075-1120).*

Dubois et al (Journal of Phys Chem 1992, 96:7137-7145).*

Balch et al. (1998) "Reactions of Transition Metal Complexes with Fullerenes ($C_{60}$, $C_{70}$, etc.) and Related Materials," *Chem Rev.* 98:2123-2166.

Beer et al. (1997) "High-Yield Reaction Extraction of Giant Fullerenes From Soot," *J. Mater. Chem.* 7:1327-1330.

Beulen et al. May 2000) "Adduct Removal from Methanofullerenes via Reductive Electrochemistry," *Chem. Commun.* :917-918.

Bolskar et al. (Apr. 2003) "First Soluble $M@C_{60}$ Derivatives Provide Enhanced Access to Metallofullerenes and Permit in Vivo Evaluation of $GD@C_{60};C(COOH)_2]_{10}$ as a MRI Contrast Agent," *J. Am. Chem. Soc.* 125(8):5471-5478.

Bolskar et al. (1996) "Synthesis and Isolation of a Fullerene Carbocation ($C_{76}^+$)," *J. Am. Chem. Soc.* 118:13093-13094.

Bolskar, R.D. (1997) "The Synthesis and Characterization of Fullerene Anion and Catiion Salts," Ph.D. Dissertation, University of Southern California, Los Angeles, CA, 125 pp.

Boudon et al. (1998) "Redox Characteristics of Covalent Derivatives of the Higher Fullerenes," $C_{70}$, $C_{76}$, and $C_{78}$, *J. Am. Chem. Soc.* 120:7860-7868.

Cerar et al. (1998) "Water-Soluble Fullerenes. 1. Fullerenehexamalonic Acid $Th-C66(COOH)12$, an Intermediate Spherical Electrolyte," *J. Phys. Chem. B* 102(38):7377-7381.

Cheng et al. (May 2000) "Synthesis and Optical Properties of Tetraethyl Methano[60]fullerenediphosphonate," *Tetrahedron Lett.* 41:3947-3950.

Diener et al. (1998) "Isolation and Properties of Small Bandgap Fullerenes," *Nature* 393:668-671.

Feng et al. (Oct. 2002) "Chemical Modification of $Tb@C_{82}$ by Copper (I)-Catalyzed Cycloadditions," *Chem. Mater.* 14:4021-4022.

Hinokuma et al. (Jun. 2001) "Fullerene Proton Conductors," *Chem. Phys. Lett.* 341:442-446.

Illescas et al. (1997) "[60] Fullerene-Based Electron Acceptors with Tetracyano-*p*-Quinodimethane (TCNQ) and Dicyano-*p*-Quinonediimine (DCNQI) Derivatives," *Tetrahedron Lett.* 38(11):2015-2018.

Krusic et al. (1991) "Radical Reactions of $C_{60}$," *Science* 254:1183-1185.

Parker et al. (1991) "High Yield Synthesis, Separation, and Mass Spectrometric Characterization of Fullerenes $C_{60}$ to $C_{266}$," *J. Am. Chem. Soc.* 113:7499-7503.

Ruoff et al. (1993) "Solubility of $C_{60}$ in a Variety of Solvents," *J. Phys. Chem.* 97:3379-3383.

Sibley et al. (1995) "Solution and Solid State Interactions of $C_{60}$ with Substituted Anilines," *J Phys. Chem* 99:5174-5276.

Unknown (Jun. 1993) "Separation of Fullerenes by Electrophoresis," *IBM Tech. Dis. Bull.* No. 6A:55-56.

Wang et al. (2002) "Monoalkylation of $C_{60}$ and $C_{70}$ with Zinc and Active Alkyl Bromides," *J. Org. Chem.* 68:3043-3048.

Wu et al. (1996) "A New Method for Facile and Selective Generation of $C_{60}$- and $C_{60}^2$ in Aqueous Caustic/THF (or DMSO)," *Tetrahedron Lett.* 37:7409-7412.

Birkett, et al. (Jun. 11, 1992) "Preparation and characterization of $C_{60}Br_6$ and $C_{60}Br_8$," *Ltrs to Nature* 357:479-481.

* cited by examiner

METHODS FOR FULLERENE RECOVERY

CROSS-REFERENCE TO RELATED APPLICATIONS

This application claims priority from U.S. provisional application No. 60/656,956, filed Feb. 28, 2005, which is incorporated in its entirety by reference herein.

STATEMENT REGARDING FEDERALLY FUNDED RESEARCH AND DEVELOPMENT

This work was funded by the National Science Foundation, Contract Number DMI-0321643. The United States Government has certain rights in this invention.

BACKGROUND OF THE INVENTION

The present invention relates generally to fullerenes, and more particularly, to the recovery of fullerenes from the carbon matrix co-produced with the fullerenes. Still more particularly, the invention relates to specific conditions for the reductive extraction of fullerenes, regardless of molecular electronic structure, from a non-fullerene carbon matrix into a solvent.

Fullerenes are the molecular form of the element carbon. They are distinguished by their multi-faceted, closed structure, where the carbon-carbon bonds form a framework of hexagons and pentagons that resembles the familiar hexagon/pentagon surface of a soccer ball. The number and positioning of the hexagons and pentagons can vary, within both constraints that exactly 12 pentagons and that an even number of carbon atoms be present. It happens that the essentially spherical molecule formed by sixty carbon atoms ($C_{60}$) comprises a particularly stable combination of hexagons and pentagons and is the most widely studied fullerene to date. In general, more than one arrangement of the hexagons and pentagons is possible, leading to a great variety of possible isomers for any particular number of carbon atoms in a fullerene. To help specify a particular fullerene isomer, the symmetry group name to which that isomer belongs is affixed to the molecular formula, but even this is imperfect as it is common for many isomers belonging to the same point group to be present for any particular number of carbon atoms.

There are two widely practiced methods for making fullerenes. The first involves evaporating carbon atoms from graphite and cooling them in such a way that some of them assemble into fullerene molecules. The second involves burning a hydrocarbon in a fuel-rich flame, and adjusting the conditions such that some of the unburnt carbon atoms condense into fullerenes. For both methods, even under optimal conditions, not all of the evaporated carbon atoms end up in fullerene molecules. The remainder condenses into carbon structures that are not molecular in nature, which we will refer to as soot. While $C_{60}$—$I_h$ forms a significant fraction of the total fullerene production, the fullerene molecules that are produced can have more than three hundred carbon atoms.

There are three established methods for the extraction of fullerenes from the surrounding carbon matrix: sublimation, solvent extraction, and, for small-bandgap fullerenes, altering the charge of the fullerene to render it soluble. Other methods for separating fullerenes from the carbon matrix involving the formation of covalent bonds between an extracting reagent and the fullerenes have been proposed, but incur the additional and usually difficult step of subsequently undoing the bond formation in order to achieve pure fullerenes. These methods are generally not practiced, except when the fullerenes are created solely for the purpose of preparing a specific fullerene derivative.

Fullerenes can be sublimed from the carbon matrix at temperatures exceeding ~400° C. However, sublimation is expensive to perform, and many fullerenes react with the matrix before subliming. Also, fullerenes trapped within matrix carbon particles cannot sublime out. For these reasons, sublimation is rarely practiced.

Solvent extraction is the most commonly practiced method for recovering fullerenes from the carbon matrix. The fullerene-containing matrix is contracted with a solvent in which certain fullerenes are soluble, such as toluene. $C_{60}$—$I_h$ can be recovered in this manner, as are several other fullerenes with isolated pentagons, including but not limited to, $C_{70}$-$D_{5h}$, $C_{76}$-$D_2$, $C_{78}$-$C_{2v}$', $C_{78}$-$C_{2v}$", $C_{78}$-$D_3$, $C_{80}$-$D_2$, $C_{84}$-$D_{2d}$ and $C_{84}$-$D_2$. However, the solvents in which the fullerenes have the best solubility are solvents that intercalate readily into the fullerene lattice, and also usually have very low vapor pressures, making it very difficult to remove the best solvents from the extracted fullerenes. For example, even though $C_{60}$ is over ten times as soluble in 1-methylnaphthalene as in toluene (Ruoff et al., 1993), 1-methylnaphthalene is virtually never used to extract fullerenes from soot, while toluene is employed routinely. Physical means may be used to break apart the soot particles trapping fullerenes inside, but there is additional cost associated with such particle disruption. Once dissolved, the fullerenes can be recovered by removing the solvent, or by diluting the solvent with another solvent in which the fullerenes have little solubility, causing the fullerenes to precipitate. However, even relatively low-boiling solvents invariably co-crystallize (intercalate) with the precipitated fullerenes to some extent. The intercalation is most pronounced with the aromatic solvents that are also the best solvents for fullerenes. It is believed to be due to the same van der Waals attractions between the solvent's pi electrons and the fullerene that allow the liquid to be an effective solvent for the fullerene.

Also, there are many fullerenes that are predicted to be thermodynamically stable, and observable by mass spectrometric analysis of the soot, but which are not found among the fullerenes that are extracted using the method described above. These also include fullerenes that have been synthesized to include a single metal atom, such as a lanthanide, actinide or alkaline earth metal atom, known as endohedral metallofullerenes. These fullerenes are known as "small-bandgap fullerenes" because of the small or zero energy difference between their filled and unfilled molecular orbitals (Diener and Alford, 1998). While certain endohedral metallofullerenes, most commonly those with a $C_{82}$ fullerene cage for the metal atom, do exhibit limited solubility in the same solvents that are useful for extraction of $C_{60}$ etc., these constitute a minority of all endohedral fullerenes formed (though the vast majority of endohedral metallofullerene research is performed on those of the $C_{82}$ fullerene). Aside from this exception, small bandgap fullerenes are not extracted by contacting with solvents. Hence, it is desirable to provide a method for recovering these previously unrecoverable fullerenes, including metallofullerenes. It is further desired to provide a fullerene isolation method that is simple and easy to execute, and that does not disrupt or affect the subject fullerenes.

Certain organic liquids containing an amine group which are commonly used as solvents exhibit a complicated behavior towards fullerenes, including the small bandgap fullerenes. Contacting fullerene containing soot with aniline or pyridine, e.g., results in fullerenes, including small bandgap fullerenes, in the liquid phase. The best explanation of the interaction between aniline (or pyridine) and the fullerenes is that of a charge-transfer complex (Sibley et al., 1995, e.g.), rather than a simple solute-solvent relationship. Since the aniline (or pyridine) cannot be separated from the fullerenes after they have been contacted, this interaction is better understood as a reactive extraction, and includes the formation of (weak) bonds between the amine and the fullerene. Other methods for reactive extraction of giant fullerenes from soot through Diels-Alder reactions are also known (Beer et al., 1997). Chemical derivatization of small bandgap fullerenes with serinol has also been disclosed (Diener and Alford, 2001). The extraction of small bandgap fullerenes and endohedral metallofullerenes with diethyl bromomalonate and 2-bromo-2-phenylacetophenone has also been demonstrated (Bolskar and Alford, 2003a).

It is also known that additional fullerenes could be extracted from the soot matrix by reduction to an anionic charge state (Diener and Alford, 1998; 2001; 2003), or chemical derivatization (ibid; Diener and Alford, 2001). In relation to this prior art, the invention was based on object of further increasing the amount of fullerenes that can be extracted and subsequently purified from the carbon matrix. From the wide variety of conditions possible within the methods given by Diener and Alford (2001), this invention discloses methods that are more effective at recovering the generally insoluble fullerenes and metallofullerenes from the soot. The methods of this invention also extract a much greater amount of soluble fullerenes, including $C_{60}$, from the soot than can be extracted by contacting with solvents. Furthermore, this invention provides for the use of solvents which are easily separated from the fullerenes following extraction.

SUMMARY OF THE INVENTION

The present invention provides a method for extracting fullerenes from a mixture containing fullerenes with a solvent and optionally subsequently precipitating the fullerenes or salts thereof from the solvent. According to a preferred embodiment, the fullerenes are extracted by contacting the fullerene-containing mixture with a metallic reducing agent in the presence of a salt and a polar solvent. In specific embodiments, the salt is a tetraaklylammonium salt or an alkylphosphonium salt. In a more specific embodiment, the alkylphosphonium salt contains alkyl groups of different lengths. In specific embodiments, the tetraalkylammonium salt is a tetrahexylammonium salt.

The method is applicable to both fullerenes that exhibit greater than 0.1 mg/ml solubility in toluene and to fullerenes that are essentially insoluble in toluene, i.e., those exhibiting less than or equal to 0.1 mg/ml solubility. The method disclosed herein extracts more of the soluble fullerenes from the carbon matrix than extraction conducted by solely contacting with solvent.

In specific embodiments, the solvent employed is polar solvent. More specifically, the solvent is not protonic. In specific embodiments, the solvent has a polarity parameter greater than about 3. Specific solvents useful in the invention are tetrahydrofuran and/or o-dichlorobenzene. Mixtures of solvents can be employed. IN a specific embodiment, the solvent is a mixture of two or more non-protonic solvents, at least one of which has a polarity parameter greater than about 3.

According to another preferred embodiment, the solvent, which contains the fullerenes after contact with the reducing agent, is separated from the remaining solids. According to an exemplary embodiment, after separation from the remaining solids, the fullerene-containing solution is contacted with an oxidizing agent, precipitating many of the fullerenes, which are subsequently collected separately from the remaining solution. Various oxidizing agents or mixtures thereof can be employed, including among others iodine, a trihaloacetic acid, an orgnaometallic molecule containing a metal in a higher oxidation state, such as Cu(II) acetate or Pb(IV) acetate, or a quinone, particularly wherein the quinone has a redox potential greater than about −0.5 V (as measured vs. Ag/Ag+ in THF with tetrabutylammonium hexafluorophosphate electrolyte), such as 2,3-dichloro-5,6-dicyanoquinone.

The method of the invention can be applied to various classes of fullerenes including small band-gap fullerenes. In one embodiment, the method of the invention can be applied to fullerenes other than small band-gap fullerenes. The method can be applied to mixtures of fullerenes produced by various art-known methods. For example, the mixtures of fullerenes may be arc soot or soot formed by combustion. Additionally, the mixture of fullerenes may be the residue that remains after extraction of soluble fullerenes from a fullerene-containing soot.

The invention further provides a method for making salts of extracted fullerenes. The invention also provides purified fullerenes that are prepared by the extraction methods herein and further provides salts of extracted fullerenes made by the methods herein.

DETAILED DESCRIPTION OF THE INVENTION

Figure 1:
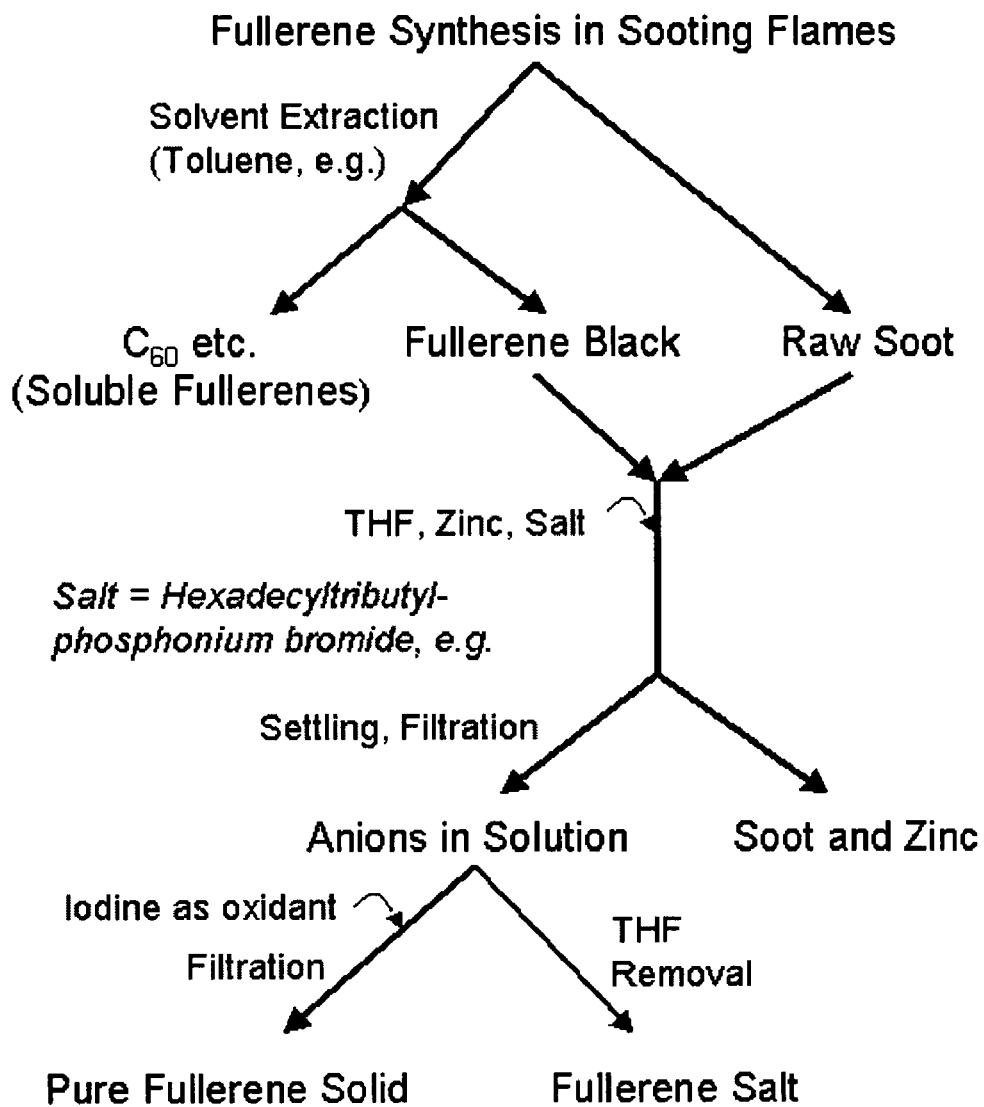
FIG. 1 is a scheme illustrating the processing of fullerenes using the methods of this invention. Specific examples of reagents and solvents are given.

A flowchart for the processing of fullerenes including the methods of this invention is shown in FIG. 1. There are three components to the process, aside from the fullerene-containing soot: a reducing agent, the solvent, and a counter cation (salt), as well as an optional oxidant.

After experimentation with different reducing agents, we have found zinc to be particularly useful for the reductive extraction of fullerenes from the soot. Diener and Alford (2001) disclose reduction by "chemical reductants," "an electrode in an electrolyte solution," "trimethylhydroquinone, mercury amalgams, alkali metals, and organic molecular anions . . . ." Zinc is comparatively inexpensive to the methods listed. Mercury is toxic and therefore undesirable. Efficient recovery of fullerenes following reduction by alkali metals requires very pure solvents, and the fullerenes are highly reduced and very reactive. The less negative standard reduction potential (i.e., $2H^+ + 2e \Rightarrow H_2$ defined as 0 V) of zinc allows the use of commercially available solvents, yet remains strong enough to extract the fullerenes in good yield. Other transition metals such as manganese, cobalt, and nickel, are also capable of extracting fullerenes from the carbon matrix, but the recovery yields are lower than that obtained with zinc. Furthermore, zinc is effective even after prolonged storage in air, whereas optimum yields from reduction with other transition metals may require additional preparation of their surfaces, removal of oxide layers, e.g. gallium, conversely, does not seem to be a sufficiently strong reducing agent for the extraction of fullerenes from carbon matrices. Zinc has previously been used to reduce $C_{60}$ as part of a method for chemical derivatization (Wang and Meier, 2002; Wang et al., 1996; Wu et al., 1996), but has never been considered as a method for inducing solubility in otherwise insoluble fullerenes, or to break bonds between normally soluble and normally insoluble fullerenes.

Alternately, we have found the common reducing agent sodium boronhydride to be useful for the reductive extraction of fullerenes from a carbon matrix. During reduction, a gas is evolved, which is believed to be hydrogen and borane in the simplest interpretation of the process. Since only the sodium ion and the fulleride anion remain in the solution, this is believed to be a method for extracting exceptionally pure fullerenes.

A cation that does not readily crystallize with fullerene anions in the chosen solvent must be present in the solution in order for the reduced fullerene anions to become soluble. Without the additional salt present, the fullerenes are not efficiently extracted. Certain cations provide far greater yields than others. Tetra-n-hexyl ammonium and n-hexadecyltri-n-butylphosphonium were found to be particularly useful when THF is used as the solvent. In general, we believe that quaternary alkyl ammonium and phosphonium cations provide the best fullerene recovery yields, provided that the alkyl chain length of at least one alkyl group is sufficient to render the salt soluble in the solvent. Asymmetric cations (e.g., those having alkyl groups of different chain lengths) also appear to be particularly useful. Certain fullerenes are also recovered with potassium cations, but, in THF the overall yield is not as high as obtained using quaternary alkyl ammonium or phosphonium cations The resulting anion from the dissolution of the salt is not known to play a role in the fullerene extraction process, except that it must allow the cation to be soluble. Examples of suitable anions of the salt include chloride, bromide, iodide, tetrafluoroborate and hexafluorophosphate.

Diener and Alford (2001) primarily focused on benzonitrile as the solvent in which the reductive extractions were performed. While chemically suitable, benzonitrile is somewhat toxic, expensive, and difficult to remove due to its high boiling point. We have found that tetrahydrofuran (THF) is particularly well-suited for the reductive extraction of fullerenes from carbon matrices. With its high volatility (boiling point of THF is 65° C., compared to 65° C. for benzonitrile), it is easily removed from the recovered fullerene product. Normally soluble fullerenes are insoluble in THF, while fullerene anions are soluble in THF, improving the recovery of fullerenes following oxidation. It is also half as expensive as benzonitrile.

While we have found THF to be particularly convenient, other solvents with sufficient polarity to dissolve fullerene anions are also acceptable. The solvent polarity parameter can be calculated from its molecular DC dielectric constant, $\in$, as $(\in-1)/(\in+2)$. Generally, salts become more soluble in aprotic solvents as the solvent polarity increases. Thus, the capacity of the solvent for fullerene anions generally increases as the solvent polarity increases. Unfortunately, many more polar solvents have low vapor pressure (benzonitrile, e.g.), and are difficult to remove from product fullerenes. We have also found mixtures of acetonitrile and aromatic solvents, such as xylene and toluene, to be useful.

Following extraction from the carbon matrix as anions, and separation from the soot by filtration (Diener and Alford, 2001), the pure charge-neutral fullerenes are recovered from the solution by oxidation. Diener and Alford, 2001, disclose methods for chemical oxidation, and more specifically, by ferrocenium hexafluorophosphate ($FcPF_6$). $FcPF_6$ is comparatively expensive to other suitable chemical oxidants; in particular, iodine and trihaloacetic acids have been found to be suitable for oxidizing the fullerene anions to a neutral charge state and are both much less expensive than $FcPF_6$. Iodine and trihaloacetic acids are especially valuable oxidants due to their low cost and sufficiently mild oxidation potential. More powerful chemical oxidants ($FeCl_3$, e.g.) catalyze Friedel-Crafts type additions of certain solvent molecules (e.g. arenes) to the fullerene.

A series of quinones were also investigated as oxidants for the process. 2,3-Dichloro-5,6-dicyanobenzoquinone (DDQ) was found to give nearly the same yield of recovered product as iodine. A smaller yield was obtained when 2,3,5,6-tetrachlorobenzoquinone (chloranil) was used as the oxidant, and essentially no yield was obtained when 2,6-dichlorobenzoquinone was used. The variation in recovery yield is presumably related to the relative redox potentials of the quinones (Table 1).

TABLE 1

Recovered fullerene yields and first reduction potentials of various oxidants, 0.1 M $TBAPF_6$ in THF.

| Oxidant | Raw Yield, % | $E_{1/2}$ vs. $Ag/Ag^+$, mV |
| --- | --- | --- |
| Iodine | 72 | +0.21 |
| DDQ | 60 | +0.14 |
| Chloranil | 23 | −0.37 |
| 2,6-dichlorobenzoquinone | <10 | −0.58 |

Cu(II) acetate and Pb(IV) acetate were also investigated instead of iodine using the reaction conditions given in Example 1, and found to recover approximately half of the SGF product as expected for oxidation by iodine. These organometallic molecules are believed to be useful oxidants because the metal has a readily accessible lower oxidation state, Cu(I) and Pb(II), respectively. Other organometallic molecules containing a metal atom in a higher oxidation state of at least two oxidation states can also presumably be used as oxidants. Trifluoroacetic acid (TFA) has previously been used as an oxidant for metallofullerene anions, and was therefore investigated. When 0.15 ml (2.0 mmol) of TFA was added to a standard size solution, little precipitate formed. Further addition of 0.35 ml (6.7 mmol total) TFA caused a bulk precipitate, which was collected for a yield of 43%.

Alternately, following extraction from the carbon matrix as anions, and separation from the soot by filtration, the fullerene anions can be precipitated from the solvent as the anion in a salt. This may be accomplished by simple evaporation of the solvent, or by addition of another liquid which is miscible with the solvent, but does not solvate the fullerene anions with the cation present. Examples of the liquid nonsolvent include, but are not limited to aliphatic hydrocarbons, such as hexane, cyclohexane, and 2-methylpentane. Additionally, the cation may optionally be metathesized with another cation during the precipitation process, to form fullerene salts with cations other than those which are most suitable for extraction of the fullerenes.

When any group, for example, of chemical species, chemical structures, chemical variable definitions, or chemical substituents is disclosed herein, it is understood that all individual members of that group and all subgroups, including any isomers and enantiomers of the group members, are disclosed separately. When Markush groups or other groupings are used herein, all individual members of each such group and all combinations and subcombinations possible of the groups are intended to be individually included in the disclosure. When a compound is described herein such that a particular isomer or enantiomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Specific names of compounds are intended to be exemplary, as it is known that one of ordinary skill in the art can name the same compounds differently.

Molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application.

Every formulation or combination of components described or exemplified herein can be used to practice the invention, unless otherwise stated. Any individual embodiments herein, for example, of reagents, components, device elements, etc., disclosed herein that are capable of use together can be employed together for the practice of the invention unless otherwise stated.

Whenever a range is given in the specification, for example, a temperature range, a time range, or a composition or concentration range, all intermediate ranges and subranges, as well as all individual values included in the ranges given are intended to be included in the disclosure.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when a compound is claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, solvents, reagents, solid substrates, synthetic methods, purification methods, and analytical methods other than those specifically exemplified can be employed in the practice of the invention without resort to undue experimentation. All art-known functional equivalents, of any such materials and methods are intended to be included in this invention. The terms and expressions which have been employed herein are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All references cited herein are incorporated by reference herein in their entirety. Some references provided herein are incorporated by reference to provide details concerning sources of starting materials (e.g., sources of fullerenes), additional starting materials, additional reagents, additional solvents, additional methods of synthesis, additional methods of analysis and additional uses of the invention.

EXAMPLES

Example 1

Figure 2:
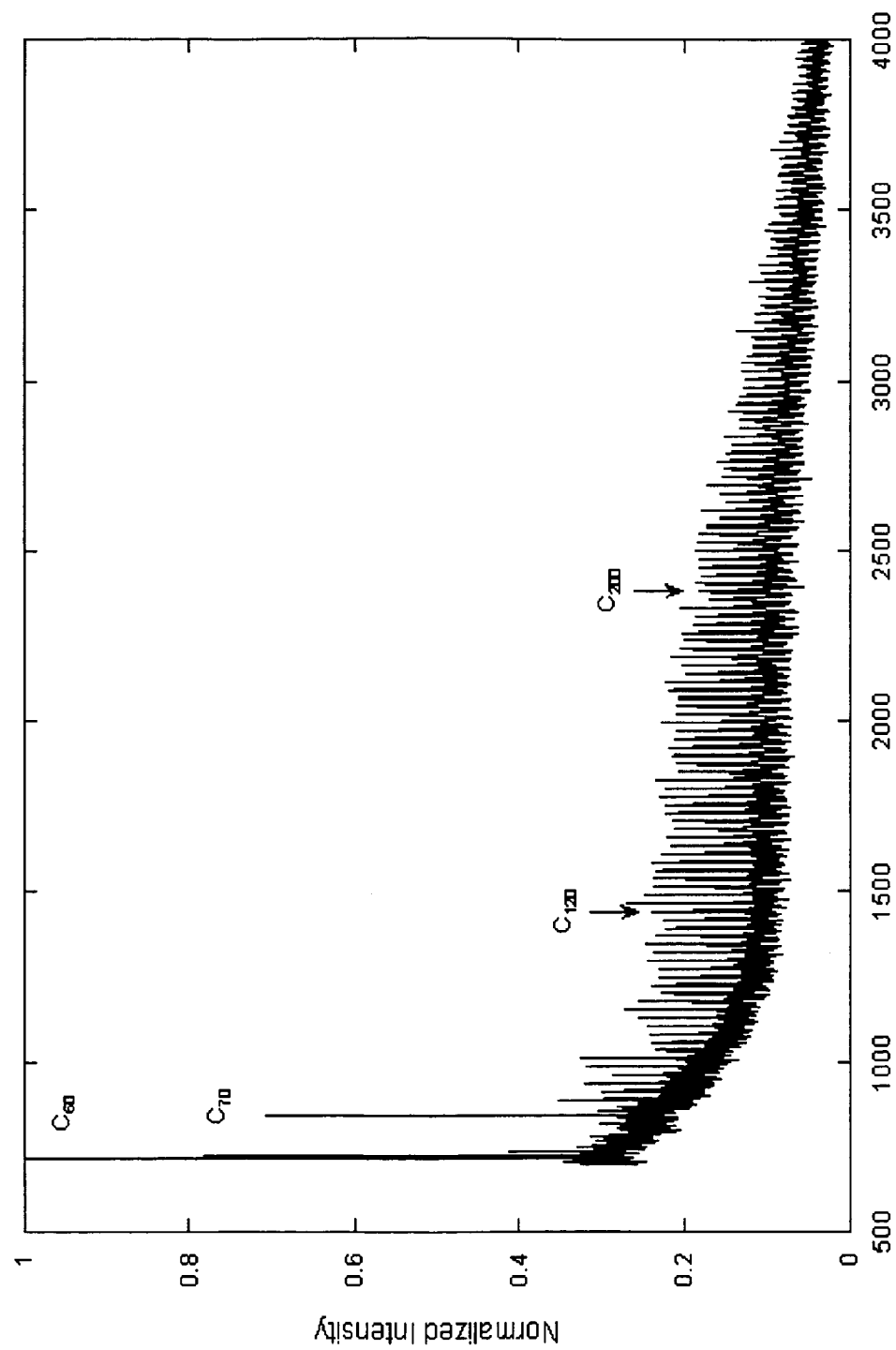
FIG. 2 is a MALDI-TOF-mass spectrum of the product of Example 1.

Frontier Black is a commercial product, created as the carbon residue of fullerene-containing soot made by the combustion process following extraction of the soluble fullerenes. 2.5 g were added to a vessel containing 2.0 g of Zinc powder and 5.0 g of $(C_{16}H_{33})(C_4H_9)_3PBr$ (n-hexadecyltri-n-butylphosphonium bromide). 500 ml of THF were added under anaerobic conditions, and the mixture was agitated vigorously. The resulting slurry was then filtered through a 0.45 micron Teflon-coated filter membrane to remove insoluble particles. Due to the fine nature of the particles, a filtering aid such diatomaceous earth, greatly improves the speed of filtration. The filtered solution was added to a second vessel containing 0.50 g of $I_2$, and the solution was again agitated. Anaerobic conditions were maintained throughout the filtration and oxidation. The solution, now a slurry, was passed through another 0.45 micron Teflon-coated filter without any filtering aid. The product (on the filter) was washed several times with acetone to remove the remaining iodine, hydrocarbon halide salts, and THF from the carbon product. The product fullerenes were recovered from the filter by scraping. 1.8 g of product was recovered (72% by weight). Matrix-assisted laser-desorption and ionization time-of-flight mass spectroscopy (MALDI-TOF-MS; FIG. 2) of the product revealed fullerenes between 60 and ~300 carbon atoms.

The elemental content of the product was analyzed by energy-dispersive x-ray spectroscopy in a scanning electron microscope. Since this method analyzes only the surface of the particles, it tends to overstate the amount of oxygen present due to the formation of surface oxides. The results of the analysis were: 98% C, 1% O, and less than 1% P, Zn, and Br (atom %). No other elements could be detected.

Figure 3:
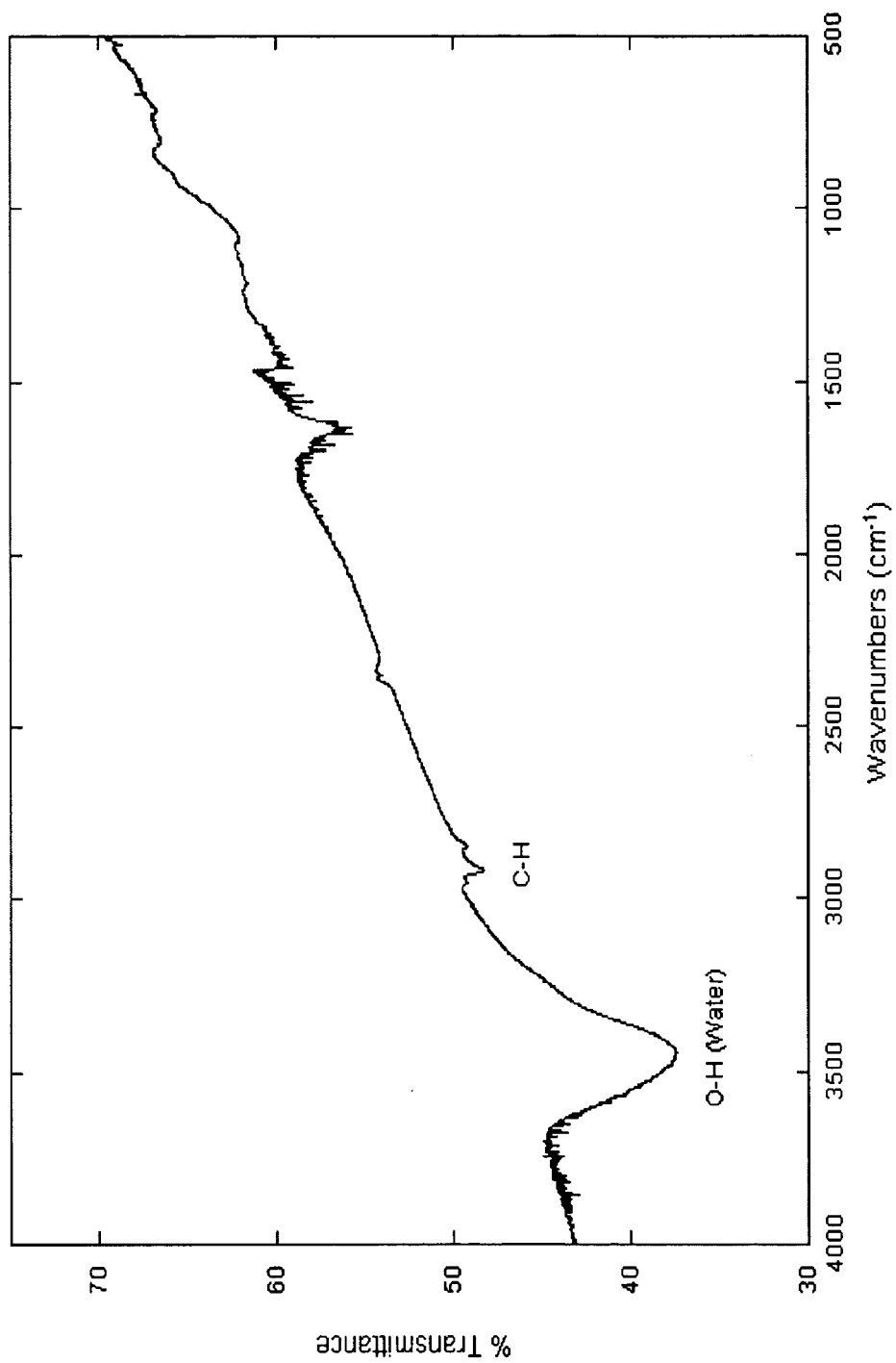
FIG. 3 is the infrared spectrum of the product of Example 1.

The product was analyzed by Fourier-Transform Infrared Spectroscopy (FTIR; FIG. 3), revealing only a very weak signal in the C—H stretching region of the spectrum. This is likely due to residual cation in the fullerene matrix. However, it is clear that the fullerene product is not a hydrocarbon derivative.

Example 2

Figure 4:
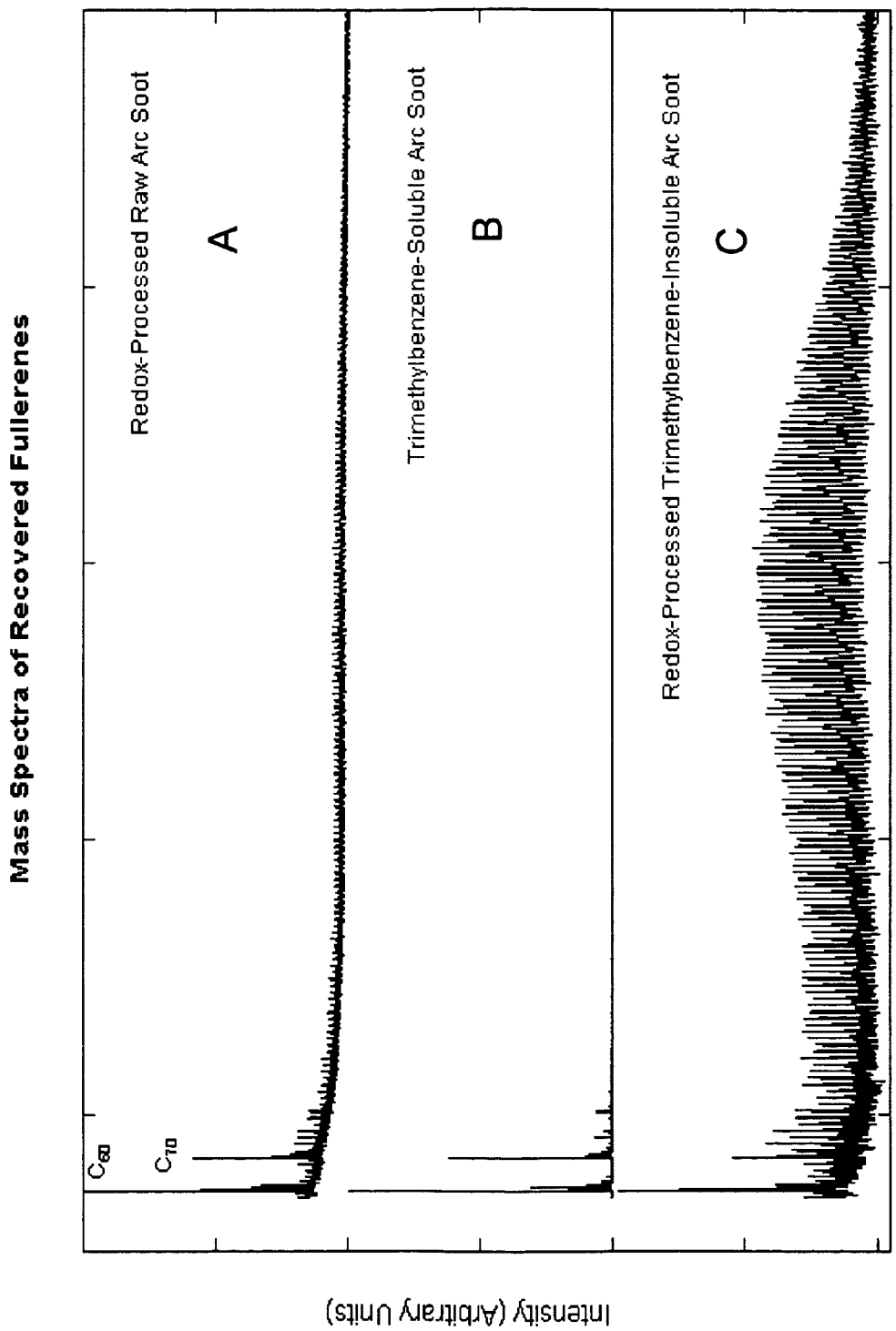
FIG. 4 shows a comparison of the MALDI-TOF mass spectra of (A) the fullerenes recovered by the redox method disclosed herein from the as-produced soot, (B) the fullerenes recovered by TMB extraction of the as-produced soot, and (C) those recovered by the redox process on the TMB-insoluble material.

This example is similar to Example 1, except that fullerene-containing carbon prepared by evaporation of POCO AXM-5Q grade graphite rods under reduced pressure was used instead of Frontier Black. This material (designated arc soot) was subjected to both solvent extraction and redox extraction. 2.5 g of arc soot was subjected to the process described in Example 1, using zinc reduction followed by iodine oxidation. 0.23 g of product was recovered (9.2% by weight). Additionally, 10.0 g of arc soot was rigorously extracted with 1,2,4-trimethylbenzene (TMB) using the method of refluxing the solvent through the soot in a porous cup for 48 h. Removal of the solvent by vacuum distillation of the extracts, followed by extensive washing of the solid with acetone resulted in 0.53 g (5.3% by weight) of TMB-soluble product. The TMB-insoluble material left in the porous cup was also recovered. 2.5 g of this material was also processed using the method in Example 1 to recover 0.11 g (4.3% by weight) of fullerenes. MALDI-TOF-MS of the fullerenes recovered by the redox method disclosed herein from the as-produced soot, the fullerenes recovered by TMB extraction of the as-produced soot, and those recovered by the redox process on the TMB-insoluble material are all shown in FIG. 4.

Example 3

Figure 5:
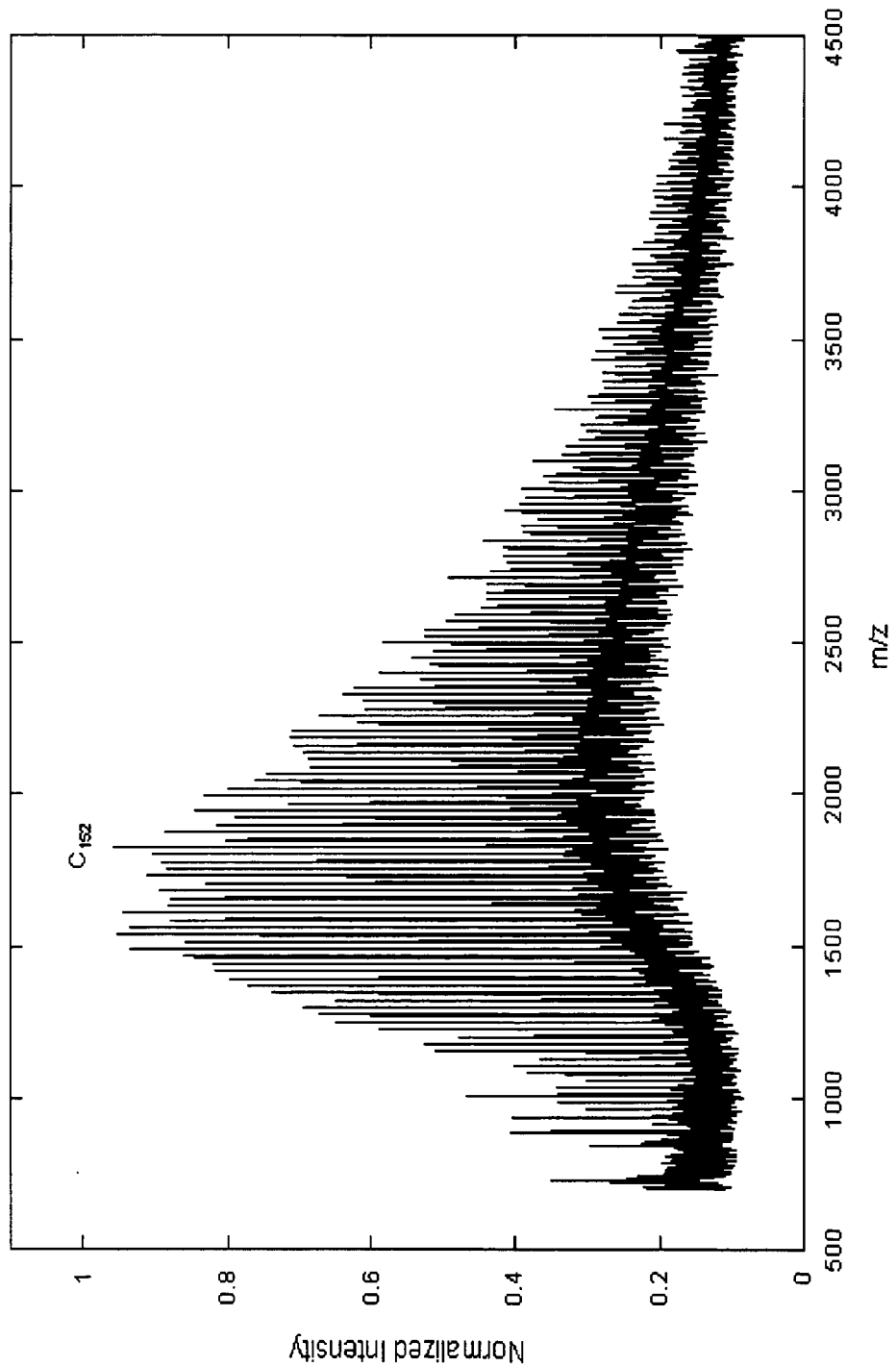
FIG. 5 is a MALDI-TOF mass spectrum of fullerenes recovered by the process of Example 3.

This example is similar to Example 1, except that sodium borohydride ($NaBH_4$) powder was used as the reductant and a 1:1 mixture of acetonitrile:o-xylene (v/v) was used as the solvent. During reduction, a gas is evolved, which in the simplest interpretation of the process is believed to be hydrogen and borane. No additional salt (ammonium or phosphonium halide, etc.) was employed. This can serve as a reduction protocol that avoids the use of transition or heavier metal elements. FIG. 5 shows a MALDI-TOF-MS of the fullerenes recovered by this process.

Example 4

Figure 6:
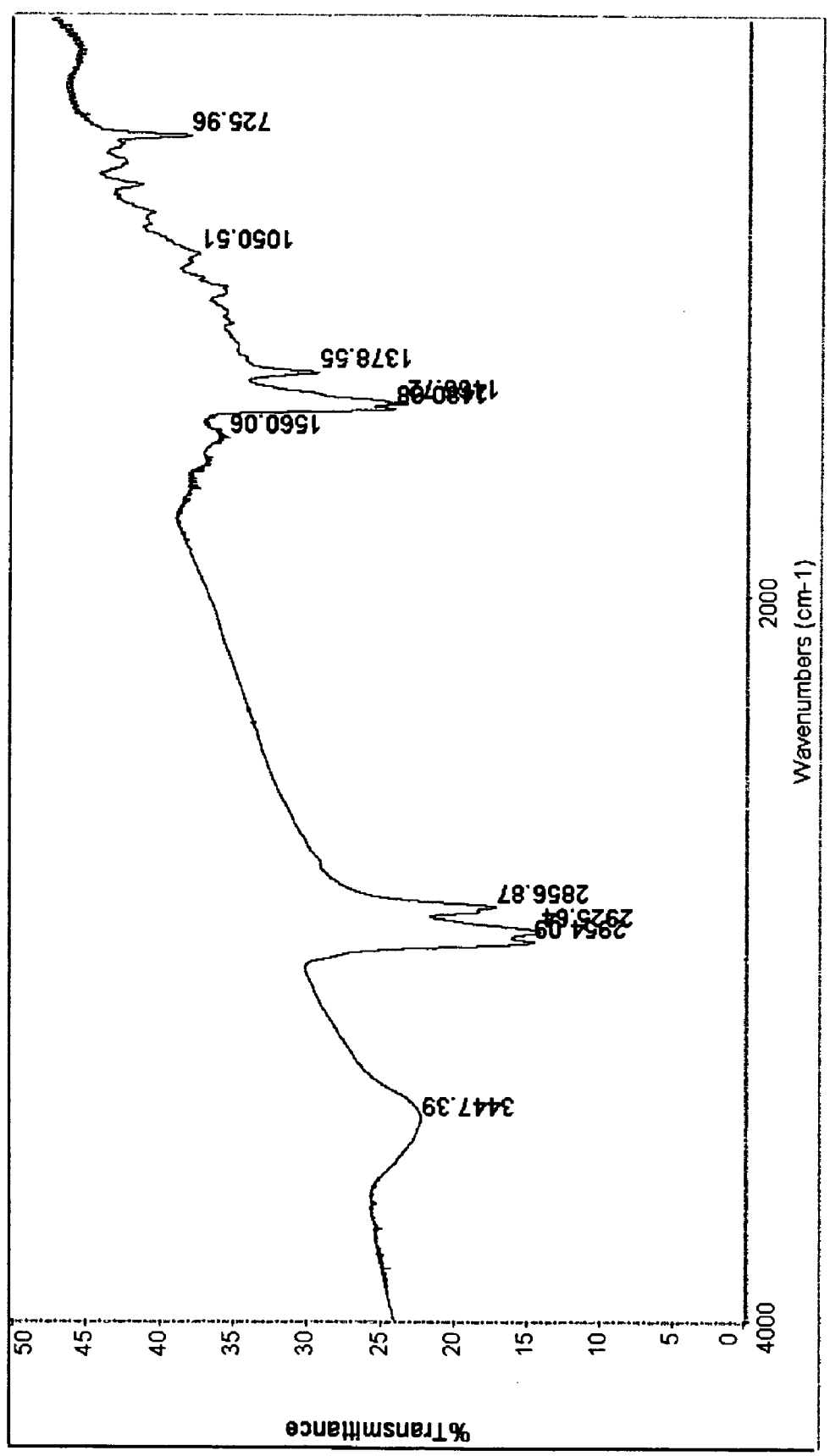
FIG. 6 is an infrared spectrum of a fullerene salt with tetrahexylammonium cations

This example is similar to Example 1, except that tetra-n-hexylammonium bromide (THABr) was used as the added halide salt. After filtration through a 0.45 μm Teflon-coated membrane filter, the fulleride solution was dried in vacuuo to remove the THF solvent, producing a very dark brown glassy THA-fulleride salt. Alternatively, the filtered fulleride solution was concentrated to a minimum volume and precipitated by the addition of the nonpolar hydrocarbon solvent n-hexane (or equivalent) to effect crystallization. The solid powder product was rinsed with excess n-hexane and dried under reduced pressure. The product was analyzed by Fourier-Transform Infrared Spectroscopy (FTIR; FIG. 6), revealing infrared absorbances characteristic of the tetra-n-hexyl ammonium counter-cation (aliphatic C—H stretch, 2857, 2926, 2954 $cm^{-1}$; —$CH_2$—, 1480, 1466 $cm^{-1}$; —$CH_3$, 1379 $cm^{-1}$.). Note that these stretches are not present in the re-oxidized fullerenes (FIG. 3). The isolated fulleride salt is useful as a solid powder with potentially improved utility and convenient storage properties. The fulleride salt product can readily be dissolved in suitable solvents for further manipulation, including treatment with an oxidant to generate the neutral insoluble fullerene, or for solution-phase cation metathesis.

REFERENCES

1. Bolskar, R. D. and Alford, J. M. (2003)(a). "Derivatization and Solubilization of the Insoluble Classes of Fullerenes," US Patent Application 20030065206 A1 Apr. 3, 2003.
2. Bolskar, R. D. and Alford, J. M. (2003)(b). "Purification of endohedral and other fullerenes by chemical methods," US Patent Application 20030157016 A1 Aug. 21, 2003.
3. Diener, M. D. and Alford J. M. (2003). "Isolation of Small-Bandgap Fullerenes and Endohedral Metallofullerenes," U.S. Pat. No. 6,527,799
4. Diener, M. D. and Alford J. M. (2001). "Isolation of Small-Bandgap Fullerenes and Endohedral Metallofullerenes," U.S. Pat. No. 6,303,016
5. Beer, F., A. Gugel, K. Martin, J. Rader, and K. Mullen (1997). "High-yield Reaction Extraction of Giant Fullerenes From Soot," *J. Mater. Chem.* 7, 1327-1330.
6. Diener, M. D. and J. M. Alford (1998). "Isolation and Properties of Small Bandgap Fullerenes," *Nature* 393, 688.
7. Ruoff, R. S., D. S. Tse, R. Malhotra, and D. C. Lorents (1993). "Solubility of $C_{60}$ in a Variety of Solvents," *J. Phys. Chem.* 97, 3379-83.
8. Sibley, S. P., R. L. Campbell, and H. B. Silber (1995). "Solution and Solid State Interactions of $C_{60}$ with Substituted Anilines," *J. Phys. Chem.* 99, 5274-5276.
9. Wang, G-W., Y. Murata, K. Komatsu, and T. S. M. Wan (1996). "The Solid-Phase Reaction of [60]fullerene: Novel Addition of Organozinc Reagents, *Chem. Comm.* 2059 (1996).
10. Wang, Z. and M. S. Meier (2002). "Monoalkylation of $C_{60}$ and $C_{70}$ with Zinc and Active Alkyl Bromides," *J. Org. Chem.* 68, 3043-8.
11. Wu, M., X. Wei, L. Qi, and Z. Xu (1996). "A New Method for Facile and Selective Generation of C60- and C602-in aqueous Caustic/THF (or DMSO),"
12. Tetrahedron Lett. v. 37, 7409-7412.

What is claimed is:

1. A method for extracting fullerenes from a mixture containing fullerenes comprising contacting the mixture with a metallic reducing agent in the presence of a salt of quaternary alkylphosphonium cation and a solvent to generate a fullerene-containing solution, wherein the alkyl groups on the quaternary alkylammonium cation or the quaternary alkylphosphonium cation are hydrocarbon chains of different lengths; and wherein the cation is n-hexadecyltri-n-butylphosphonium cation.

2. The method according to claim 1, further including separating the fullerene-containing solution from any remaining solids, and with the additional step of contacting the separated fullerene-containing solution with an oxidizing agent.

3. The method according to claim 2, wherein the oxidizing agent is iodine.

4. The method according to claim 2, wherein the oxidizing agent is a trihaloacetic acid.

5. The method according to claim 2, wherein the oxidizing agent is 2,3-dichloro-5,6-dicyanoquinone.

6. The method according to claim 2, wherein the oxidizing agent is Cu(II) acetate or Pb(IV) acetate.

7. The method of claim 1 wherein the metallic reducing agent is zinc.

8. The method of claim 7, wherein the mixture containing fullerenes is the residue that remains after extraction of soluble fullerenes from a fullerene-containing soot.

* * * * *